United States Patent
Ke

(10) Patent No.: US 11,397,676 B2
(45) Date of Patent: Jul. 26, 2022

(54) COMPUTER PROGRAM PRODUCT AND METHOD AND APPARATUS FOR MANAGING GARBAGE COLLECTION PROCESS

(71) Applicant: Silicon Motion, Inc., Zhubei (TW)

(72) Inventor: Kuan-Yu Ke, Zhubei (TW)

(73) Assignee: SILICON MOTION, INC., Zhubei (TW)

(*) Notice: Subject to any disclaimer, the term of this patent is extended or adjusted under 35 U.S.C. 154(b) by 0 days.

(21) Appl. No.: 17/026,961

(22) Filed: Sep. 21, 2020

(65) Prior Publication Data

US 2021/0318954 A1 Oct. 14, 2021

(30) Foreign Application Priority Data

Apr. 8, 2020 (CN) .......................... 202010268085.7

(51) Int. Cl.
*G06F 12/02* (2006.01)
*G06F 12/0891* (2016.01)
*G06F 12/0882* (2016.01)

(52) U.S. Cl.
CPC ...... *G06F 12/0253* (2013.01); *G06F 12/0246* (2013.01); *G06F 12/0882* (2013.01); *G06F 12/0891* (2013.01); *G06F 2212/7209* (2013.01)

(58) Field of Classification Search
CPC ............. G06F 12/0253; G06F 12/0882; G06F 12/0246; G06F 12/0891; G06F 2212/7209
See application file for complete search history.

(56) References Cited

U.S. PATENT DOCUMENTS

| | | | |
|---|---|---|---|
| 8,521,949 B2 | 8/2013 | Xiong et al. | |
| 9,343,153 B2 | 5/2016 | Kawamura et al. | |
| 2014/0244912 A1 | 8/2014 | Birk et al. | |
| 2018/0004653 A1* | 1/2018 | Moon | G06F 12/0246 |
| 2018/0052625 A1* | 2/2018 | Cho | G06F 3/064 |
| 2018/0253376 A1* | 9/2018 | Nishikubo | G06F 3/0679 |
| 2018/0307496 A1* | 10/2018 | Ke | G06F 11/0757 |
| 2019/0146704 A1 | 5/2019 | Lin et al. | |
| 2020/0257621 A1* | 8/2020 | Pletka | G06F 12/0253 |

FOREIGN PATENT DOCUMENTS

| | | |
|---|---|---|
| JP | 4280055 B2 | 6/2009 |
| TW | I653538 B | 3/2019 |

OTHER PUBLICATIONS

English Translation of Taiwanese Search Report for Taiwanese Application No. 109111695, dated Feb. 28, 2021.

\* cited by examiner

*Primary Examiner* — Tasnima Matin
(74) *Attorney, Agent, or Firm* — Birch, Stewart, Kolasch & Birch, LLP

(57) ABSTRACT

The invention relates to a non-transitory computer program product, a method and an apparatus for managing garbage collection process. The non-transitory computer program product includes program code to: determine source blocks to be processed, wherein each source block includes an invalid page; program user data of valid pages in the source blocks, whose quantity is less than a total number of pages in one first-type physical block, into empty pages in a second-type physical block, wherein the total number of pages in one first-type physical block is greater than a total number of pages in one second-type physical block; and fill remaining empty pages in the second-type physical block with dummy values.

20 Claims, 7 Drawing Sheets

COMPUTER PROGRAM PRODUCT AND METHOD AND APPARATUS FOR MANAGING GARBAGE COLLECTION PROCESS

CROSS-REFERENCE TO RELATED APPLICATIONS

This application claims the benefit of priority to Patent Application No. 202010268085.7, filed in China on Apr. 8, 2020; the entirety of which is incorporated herein by reference for all purposes.

BACKGROUND

The disclosure generally relates to storage devices and, more particularly, to a computer program product, a method, and an apparatus for managing garbage collection process.

Flash memory devices typically include NOR flash devices and NAND flash devices. NOR flash devices are random access-a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

After numerous accesses, a physical page may include valid and invalid pages (also referred to as stale pages), in which the valid pages store valid user data while the invalid pages store invalid (old) user data. When detecting that available space of a storage device is lower than a threshold, a flash controller may issue read instructions to direct the storage device to read and collect user data of the valid pages of one or more physical blocks, and then, issue write instructions to direct the storage device to program the collected user data into empty physical pages of an spare or active block, thereby making the data block storing no valid user data be able to erase to become spare blocks. The data block after being erased provides space for storing more data. The above steps are referred to as a Garbage Collection (GC) process. However, a poorly-designed GC process would degrade the overall performance of the storage device. Thus, it is desirable to have a computer program product, a method, and an apparatus for managing garbage collection process to optimize the execution of GC process.

SUMMARY

In an aspect of the invention, an embodiment introduces a non-transitory computer program product for managing garbage collection process. The non-transitory computer program product includes program code to: determine source blocks to be processed, where each source block includes an invalid page; program user data of valid pages in the source blocks, whose quantity is less than a total number of pages in one first-type physical block, into empty pages in a second-type physical block; and fill remaining empty pages in the second-type physical block with dummy values.

In another aspect of the invention, an embodiment introduces a method for managing garbage collection process to include: determining source blocks to be processed, where each source block includes an invalid page; programming user data of valid pages in the source blocks, whose quantity is less than a total number of pages in one first-type physical block, into empty pages in a second-type physical block; and filling remaining empty pages in the second-type physical block with dummy values.

In still another aspect of the invention, an embodiment introduces an apparatus for managing garbage collection process to include a flash interface and a processing unit. The processing unit is arranged operably to determine source blocks to be processed, where each source block comprises an invalid page; drive the flash interface to program user data of valid pages in the source blocks, whose quantity is less than a total number of pages in one first-type physical block, into empty pages in a second-type physical block; and drive the flash interface to fill remaining empty pages in the second-type physical block with dummy values.

The total number of pages in one first-type physical block is greater than a total number of pages in one second-type physical block Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
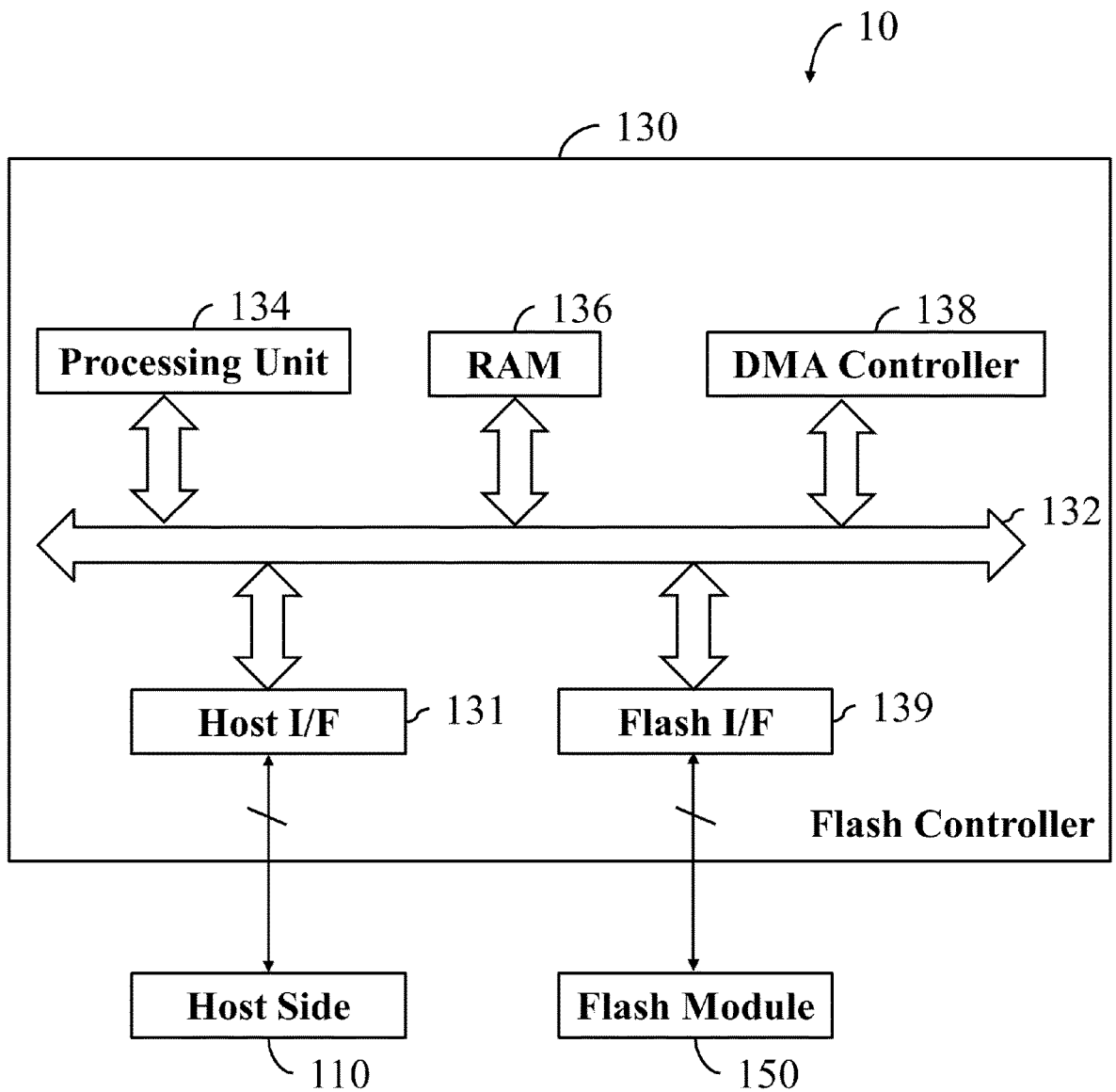
FIG. 1 is the system architecture of an electronic apparatus according to an embodiment of the invention.

Refer to FIG. 1. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and a host interface (I/F) 137 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. A flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes a processing unit 134 and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 receives host commands, such as host read, write, trim, erase commands, through the host I/F 131, schedules and executes these commands. The flash controller 130 includes a Random Access Memory (RAM) 136 and the RAM 136 may be implemented in a Dynamic Random Access Memory (DRAM), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash (H2F) tables, flash-to-host (F2H) tables, and so on. The flash I/F 139 includes a NAND flash controller (NFC) to provide functions that are required to access to the flash module 150, such as a command sequencer, a Low Density Parity Check (LDPC) encoder/decoder, etc.

A bus architecture 132 may be configured in the flash controller 130 for coupling between components to transfer data, addresses, control signals, etc., which include the host I/F 131, the processing unit 134, the RAM 136, the direct memory access (DMA) controller 138, the flash I/F 139, and so on. In some embodiments, the host I/F 131, the processing unit 134, the RAM 136, the DMA controller 138, the flash I/F 139 are coupled to each other by a single bus. In alternative embodiments, a high-speed bus is configured in the flash controller for coupling the processing unit 134, the DMA controller 138 and the RAM 136 to each other and a low-speed bus is configured for coupling the processing unit 134, the DMA controller 138, the host I/F 131 and the flash I/F 139 to each other. The DMA controller 138 may move data between the components through the bus architecture according to instructions issued by the processing unit 134, for example, moving data in a specific data buffer of the host I/F 131 or the flash I/F 139 to a specific address of the RAM 136, moving data in a specific address of the RAM 136 to a specific data buffer of the host I/F 131 or the flash I/F 139, or others.

The bus includes a set of parallel physical-wires connected to two or more components of the flash controller 130. The bus is a shared transmission medium, so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

When each memory cell of one physical block is SLC capable of recording two states, each physical wordline stores user data of single pages. When each memory cell of one physical block is MLC capable of recording four states, each physical wordline may store user data of dual-pages, including Most Significant Bit (MSB) pages and Least Significant Bit (LSB) pages. When each memory cell of one physical block is TLC capable of recording eight states, each physical wordline may store user data of triple-pages, including MSB pages, Center Significant Bit (CSB) pages and LSB pages. When each memory cell of one physical block is QLC capable of recording sixteen states, each physical wordline may store user data of quad-pages, including Top Significant Bit (TSB) pages, MSB pages, CSB pages and LSB pages. The aforementioned physical blocks including SLCs, MLCs, TLCs and QLCs can be regarded as different types of physical blocks.

Figure 2:
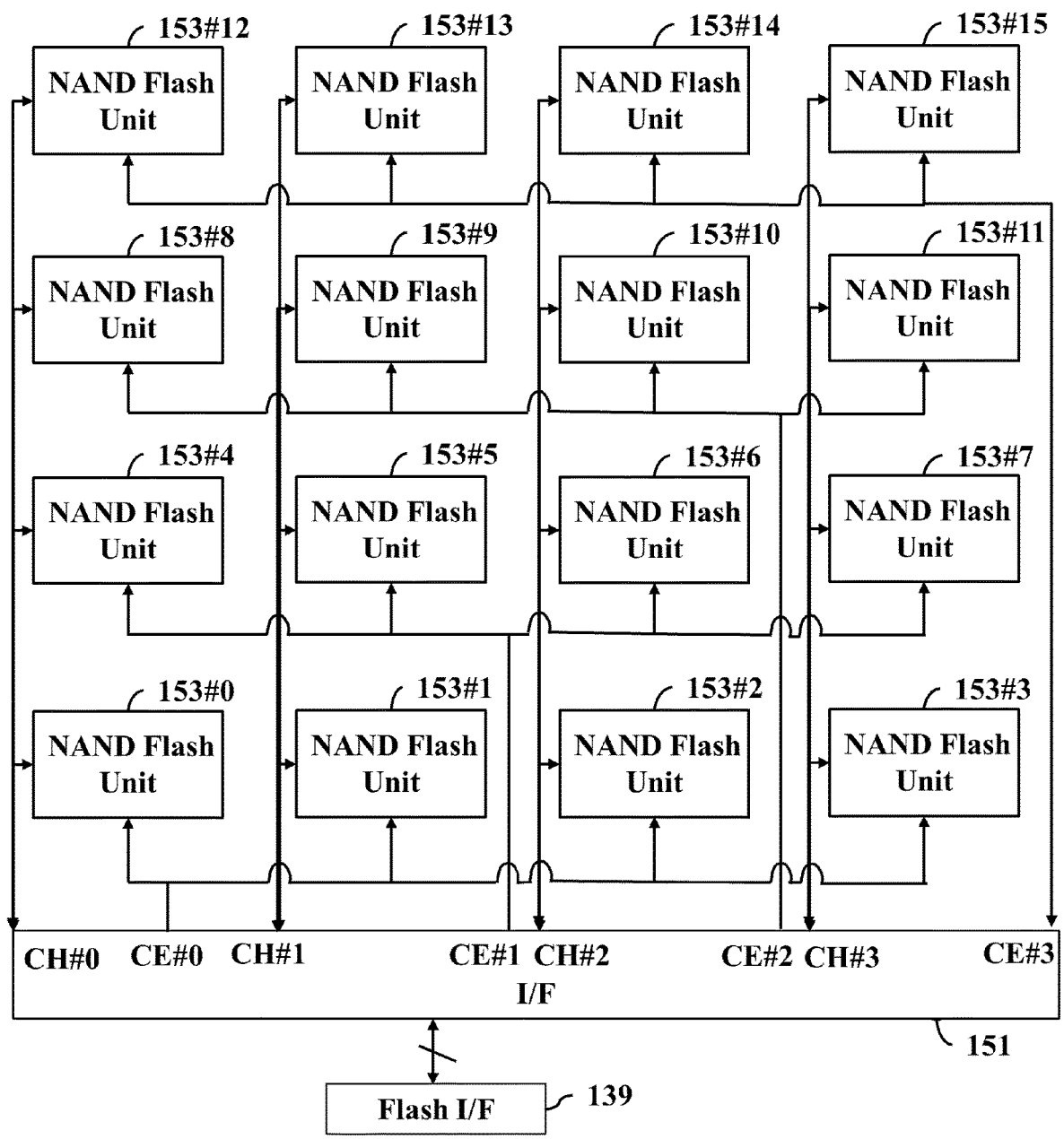
FIG. 2 is a schematic diagram illustrating a flash module according to an embodiment of the invention.

Refer to FIG. 2. The flash I/F 151 may include four I/O channels (hereinafter referred to as channels) CH #to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153

3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
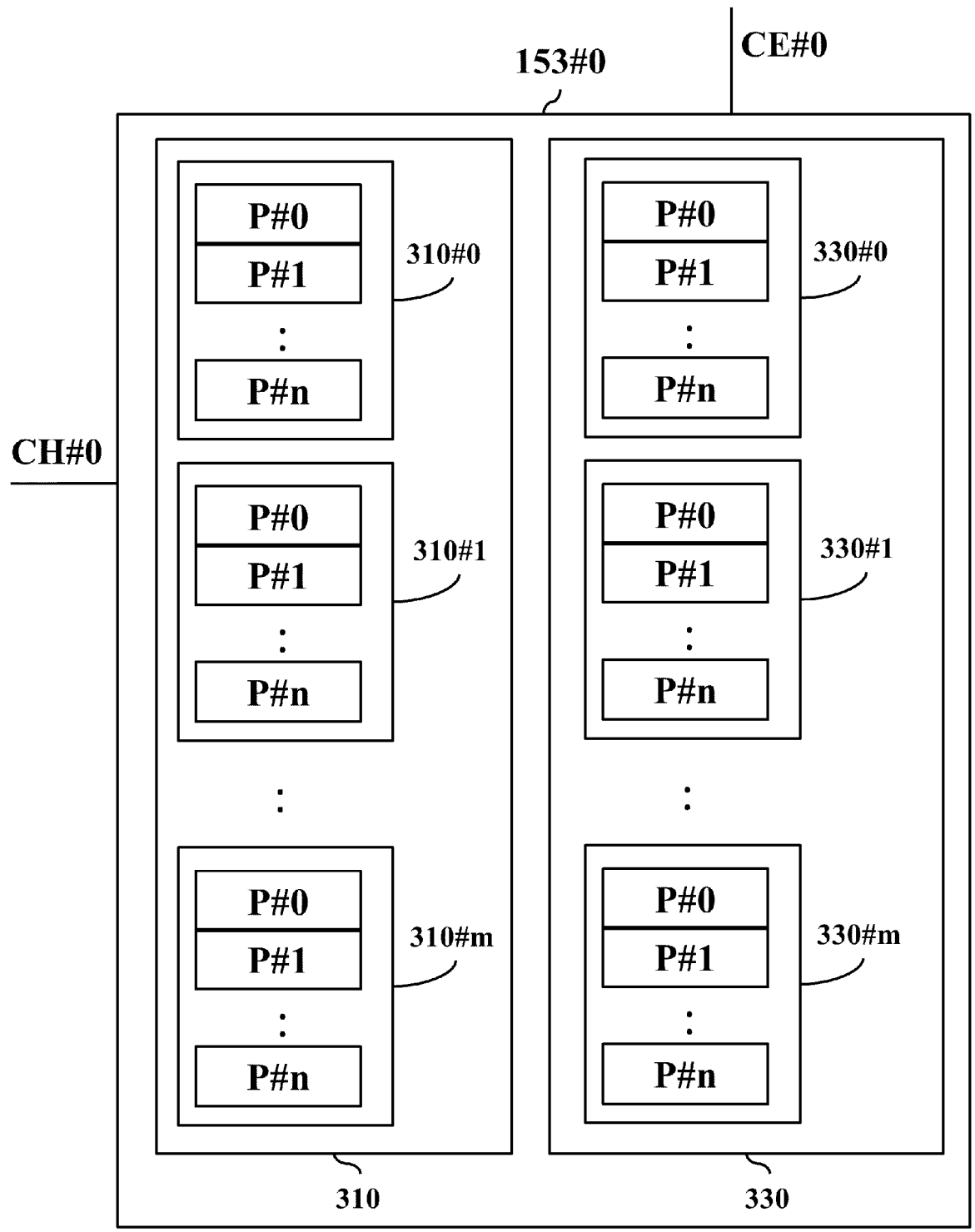
FIG. 3 is a schematic diagram illustrating NAND flash units according to an embodiment of the invention.

Each NAND flash unit may include multiple data planes, each data plane may include multiple physical blocks and each physical block may include multiple physical pages. Refer to FIG. 3 for an embodiment of a NAND flash unit. The NAND flash unit 153 #0 includes two data planes 310 and 330. The data plane 310 includes physical blocks 310 #0 to 310 #m and the data plane 330 includes physical blocks 330 #0 to 330 #m. Each physical block includes n+1 physical pages. The NAND flash units, the physical blocks and the physical pages may be identified by Logical Block Numbers (LUNs), block numbers and page numbers, respectively, and any combinations of the above numbers can be called physical addresses of the flash module 150. Any physical block of each data plane may be configured as a SLC, MLC, TLC or QLC block.

Figure 4:
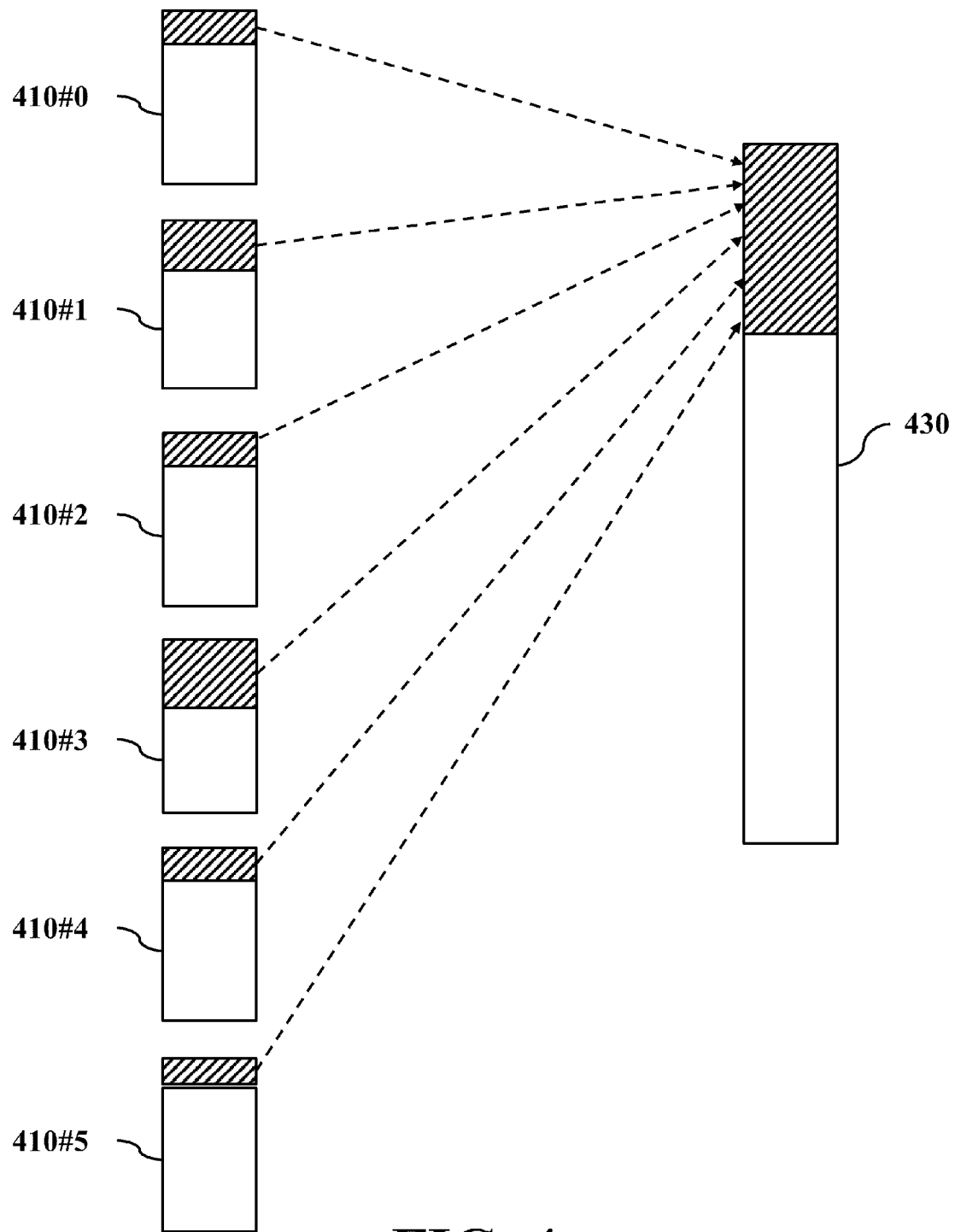
FIG. 4 is a schematic diagram illustrating a garbage collection (GC) process in some implementations.

When available storage space of the flash module 150 is less than a threshold, such as ½ or ⅓ physical blocks, the flash controller 130 activates a garbage collection (GC) process to release storage space including invalid pages. It is noted that the GC process is a process triggered by the flash controller 130 actively, rather than being triggered according to any command issued by the host side 110. In some implementations, the processing unit 14 collects user data of valid pages of multiple SLC blocks (referred to as source blocks) and programs the collected user data into empty pages of one or more TLC blocks (referred to as destination blocks). The source blocks after being erased by the processing unit 134 provide storage space for storing forthcoming user data from the host side 110. However, when a quantity of the valid pages in the source blocks is less than the total number of pages in one TLC block, the remaining empty pages of the TLC block that do not store user data need to be filled with dummy values to close block. Refer to FIG. 4. The processing unit 134 collects user data of valid pages (represented in the slashed boxes) in the SLC blocks 410 #0 to 410 #5 and programs the collected user data into empty pages (represented in the slashed box) in the TLC block 430. After that, the processing unit 134 fills the remaining empty pages with dummy values. Although dummy values are useless, it requires a write operation to complete that and the flash module 150 still consumes time to program dummy values, which is the same as that for actual user data.

Figure 5:
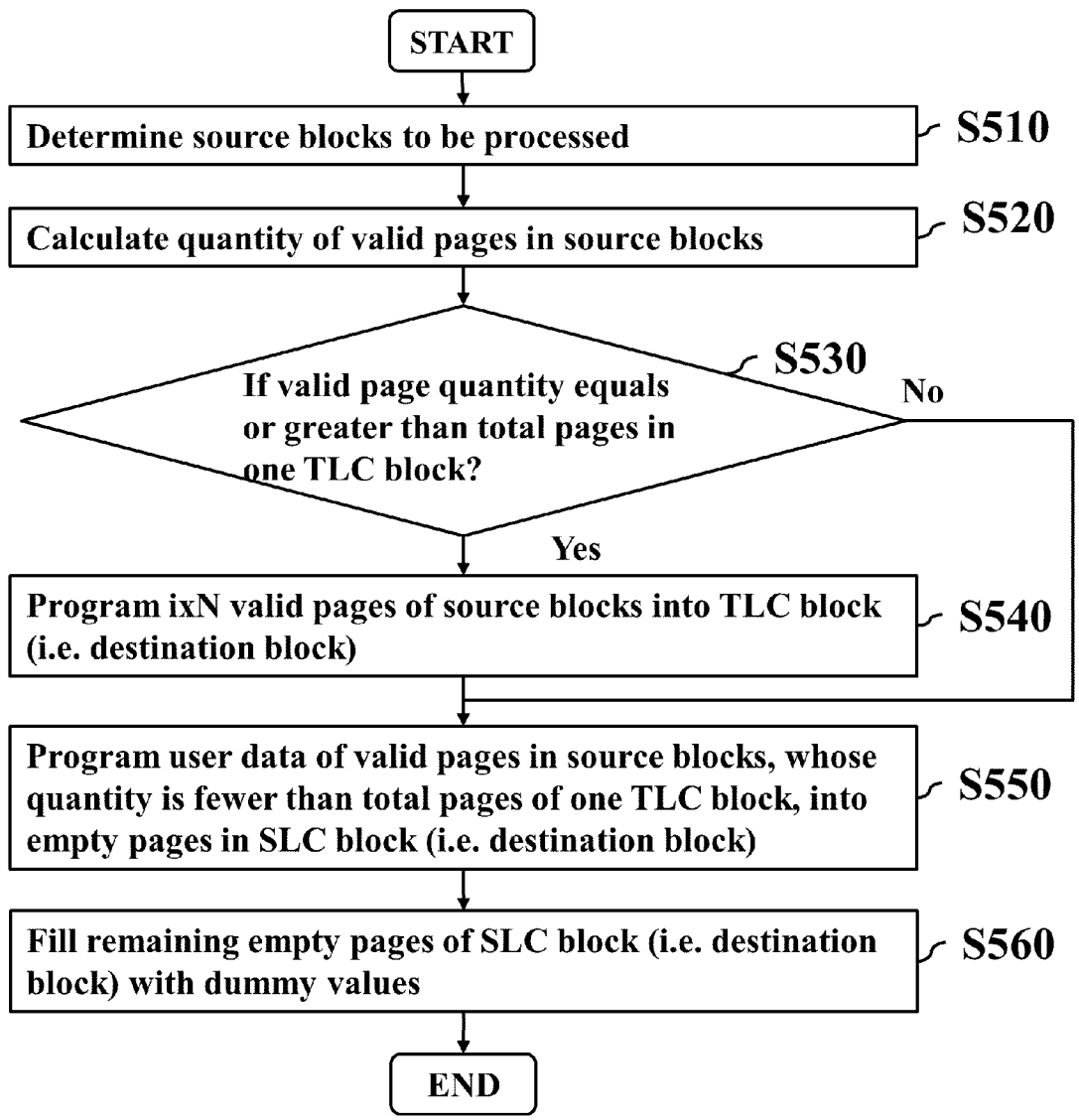
FIG. 5 is a flowchart illustrating a method for managing a GC process according to an embodiment of the invention.

To address the problems produced in the implementations described above, an embodiment of the invention introduces a method for managing a GC process, which is performed by the processing unit 134 when loading and executing relevant firmware or software instructions. Refer to FIG. 5. Detailed operations are described as follows:

Step S510: Source blocks to be processed in the flash module 150 are determined. The processing unit 134 may select multiple physical blocks including invalid pages as source blocks. The source pages may include SLC, MLC, TLC or QLC blocks, or any combination thereof.

Step S520: A quantity of valid pages in the source blocks is calculated.

Step S530: It is determined whether the quantity of valid pages is equal to or greater than the total number of pages in one TLC block. If so, the process proceeds to step S540. Otherwise, the process proceeds to step S550.

Step S540: User data of i×N valid pages in the source blocks is programmed into at least one TLC block (also referred to as a destination block) in the flash module 150, where i×N<M, i represents an integer greater than zero, M represents the quantity of valid pages, and N represents the total number of pages in one TLC block. The processing unit 134 drives the flash I/F 139 to complete read operations from i×N valid pages in the source blocks and write operations to the TLC block or blocks.

Step S550: User data of the remaining valid pages (whose quantity is fewer than the total number of pages in one TLC block) in the source blocks is programmed into empty pages of at least one SLC block (also referred to as a destination block) in the flash module 150. It is to be noted that the quantity of the remaining valid pages in the source blocks may be greater than the total number of pages in one SLC block. The processing unit 134 drives the flash I/F 139 to complete read operations from the remaining valid pages in the source blocks and write operations to the SLC block or blocks.

Step S560: The remaining empty page or pages of the SLC block or blocks (also referred to as the destination block or blocks) in the flash module 150 is or are filled with dummy values. It is to be noted that since the write operations to the TLC block employs the Foggy-to-Fine (F2F) technology, the complexity of data programming into one TLC block is higher than that into one SLC block, and the time required for programming data into one TLC block is longer than that into one SLC block. Additionally, since the total number of empty pages in one TLC block is greater than that in one SLC block, which is about three times the total number of empty pages in one SLC block, the quantity of the remaining pages in the TLC block is usually greater than that in the SLC block.

Figure 6:
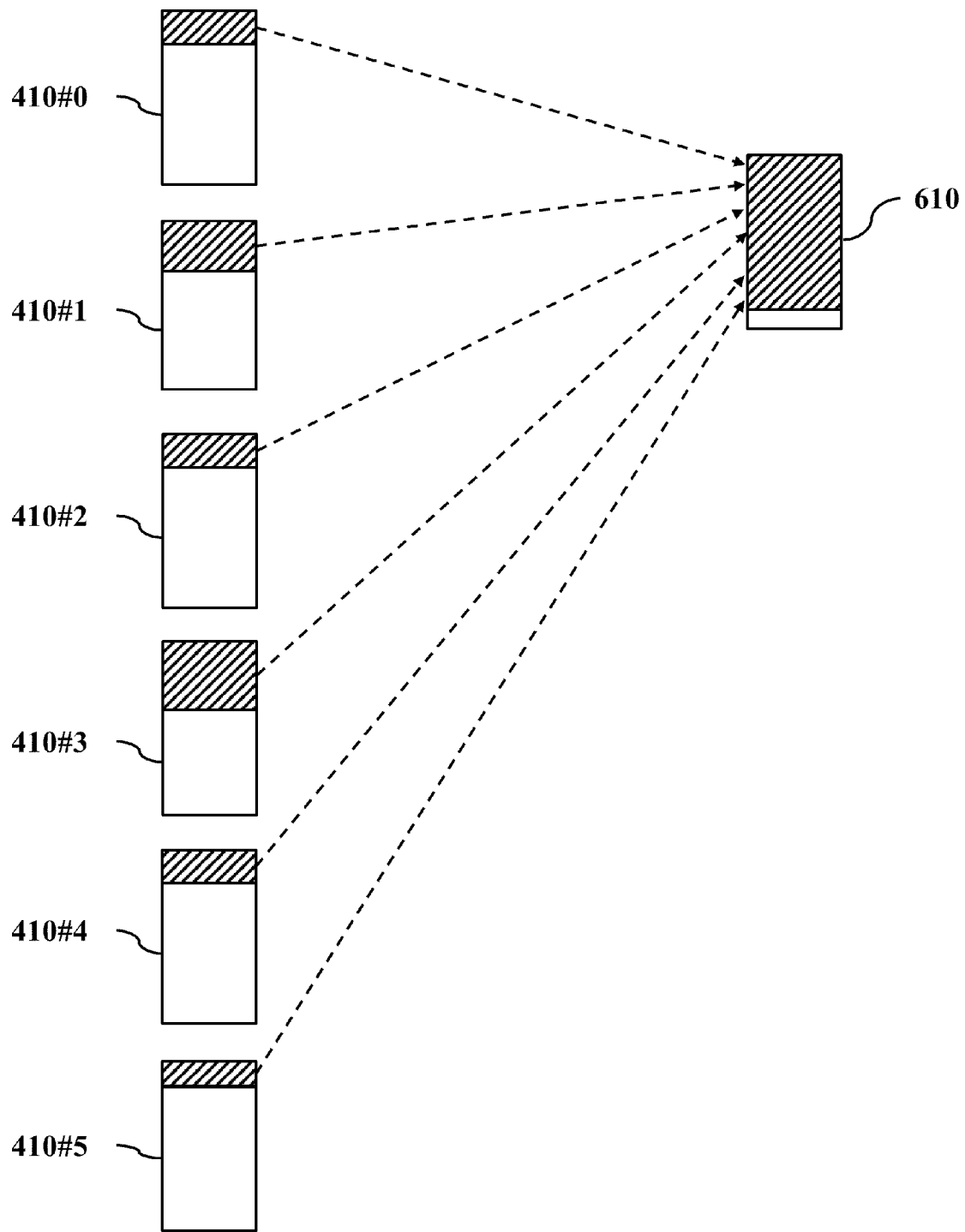
FIGS. 6 and 7 are schematic diagrams illustrating GC processes according to embodiments of the invention.

In contrast to the use case shown in FIG. 4, refer to FIG. 6. Through the method described above, the processing unit 134 programs the collected user data of valid pages (represented in the slashed boxes) in the SLC blocks 410 #0 to 410 #5 into empty pages (represented in the slashed box) in the SLC block 610. As a result, fewer dummy values are filled with the remaining pages.

Figure 7:
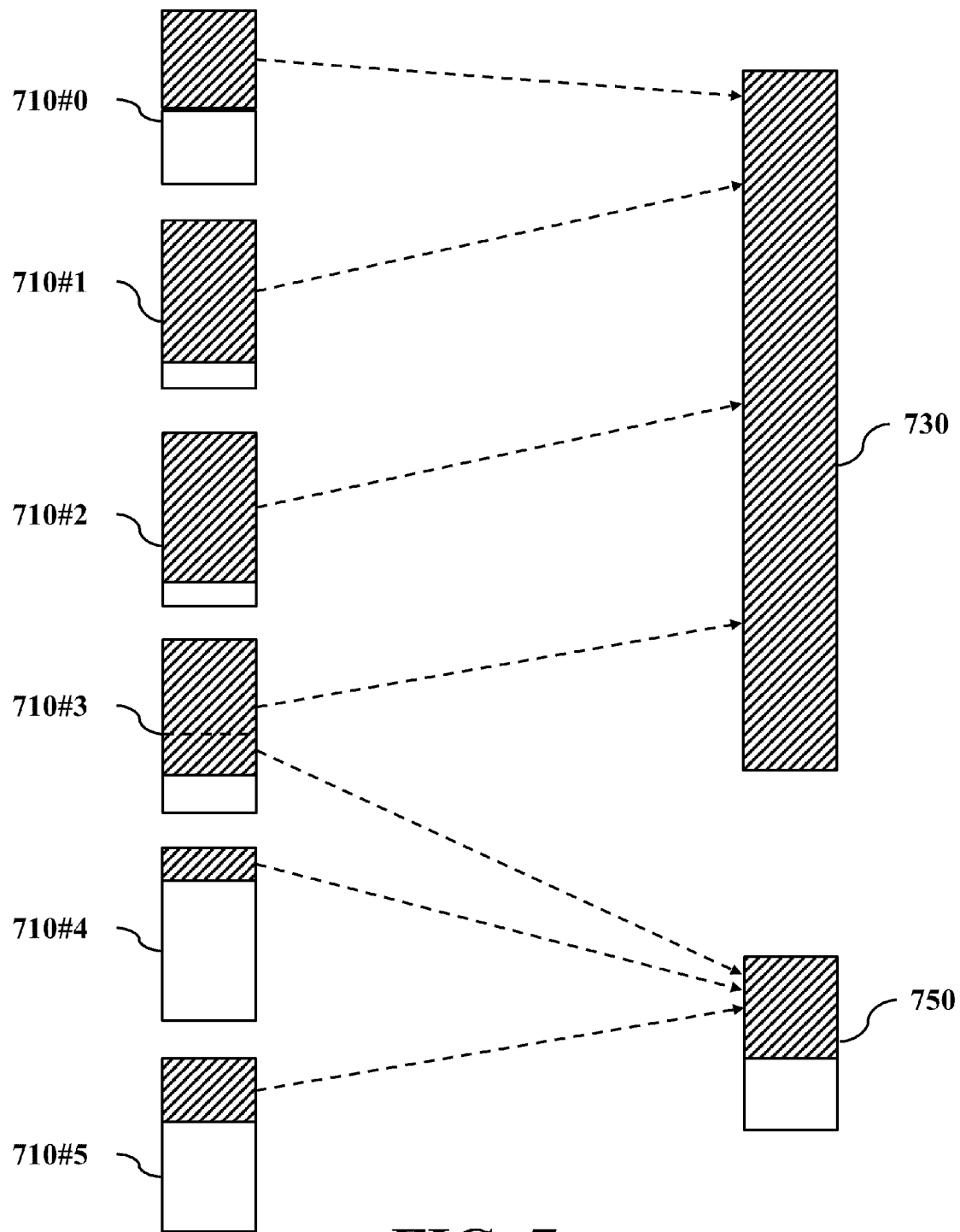

Additionally, refer to FIG. 7 showing another use case. The processing unit 134 collects user data of valid pages (represented in the slashed boxes) in the SLC blocks 710 #0 to 710 #5, programs a portion of the collected user data into all pages (represented in the slash box) in the TLC block 730 and programs the remaining user data into empty pages (represented in the slash box) in the SLC block 750. Next, the processing unit 134 fills the remaining empty pages with dummy values.

Although valid pages and invalid pages in each physical block shown in FIGS. 6 and 7 are two continuous regions, respectively, this is merely simplified expression for convenience of description. Actually, valid pages are usually interlaced with invalid pages in each physical block, the invention should not be limited thereto. For example, valid pages in a physical block are pages P #0~5, P #10~15, P #20~25 and P #30~35.

The GC process management method described in the above embodiments of the invention can be slightly modified to apply to a scenario for QLC blocks. Step S530 is devised to determine whether the quantity of valid pages is equal to or greater than the total number of pages in one QLC block. Step S540 is devised to program user data of i×N valid pages in the source blocks into at least one QLC block (also referred to as a destination block) in the flash module 150, where i×N<M, i represents an integer greater than zero, M represents the quantity of valid pages, and N represents the total number of pages in one QLC block. Step S550 is devised to program user data of the remaining valid pages (whose quantity is less than the total number of pages in one QLC block) in the source blocks into empty pages of at least one SLC block (also referred to as a destination block) in the flash module 150.

In an aspect of the invention, the processing unit 134 is arranged operably to determine source blocks to be processed, where each source block includes at least one invalid page; program user data of valid pages in the source blocks, whose quantity is less than (or fewer than) the total number of pages in one first-type physical block, into empty pages in a second-type physical block, where the total number of pages in one first-type physical block is greater than the total number of pages in one second-type physical block; and fill remaining empty pages in the second-type physical block with dummy values, so as to avoid spending too much time and resources to fill in dummy values. For example, the total number of pages in one first-type physical block (e.g. one TLC or QLC block) is at least twice the total number of pages in one second-type physical block (e.g. one SLC block). The total number of pages in one first-type physical block and the total number of pages in one second-type physical block means the maximum numbers of empty pages that can be used to store user data in one first-type physical block and one second-type physical block, respectively.

The SLC block is closed after the remaining empty pages in the SLC block is filled with dummy values, as recited in step S560. Thus, compared with the implementations described above, through the judgement of step S530 and the writing operation of step S560, the resources and time required to close a block would be reduced, and the efficiency of performing the GC process would be improved.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged operably to perform the aforementioned operations. While the process flows described in FIG. 5 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer program product for managing garbage collection process when executed by a processing unit of a flash controller, the non-transitory computer program product comprising program code to:
   determine source blocks to be processed, wherein each source block comprises an invalid page;
   calculate a quantity of the valid pages in the source blocks;
   determine whether the quantity of the valid pages is less than a total number of pages in one first-type physical block;
   when the quantity of the valid pages is less than the total number of pages in one first-type physical block, program user data of valid pages in the source blocks into empty pages in a second-type physical block, wherein the total number of pages in one first-type physical block is greater than a total number of pages in one second-type physical block; and
   fill remaining empty pages in the second-type physical block with dummy values.

2. The non-transitory computer program product of claim 1, comprising program code to:
   when the quantity of the valid pages is equal to or greater than the total number of pages in one first-type physical block, program user data of i×N valid pages in the source blocks into at least one first-type physical block, wherein i×N<M, i represents an integer greater than zero, M represents the quantity of the valid pages, and N represents the total number of pages in one first-type physical block, and program user data of the remaining valid pages in the source blocks into an empty page of the second-type physical block; and
   when the quantity of the valid pages is less than the total number of pages in one first-type physical block, program user data of the valid pages in the source blocks into an empty page of the second-type physical block.

3. The non-transitory computer program product of claim 1, wherein the total number of pages in one first-type physical block is at least twice the total number of pages in one second-type physical block.

4. The non-transitory computer program product of claim 1, wherein the first-type physical block is a Triple Level Cell (TLC) block or a Quad-Level Cell (QLC) block, and the second-type physical block is a Single Level Cell (SLC) block.

5. The non-transitory computer program product of claim 1, wherein each source block is a Single Level Cell (SLC) block.

6. The non-transitory computer program product of claim 1, comprising program code to:
   close the second-type physical block after filling the remaining empty pages in the second-type physical block with dummy values.

7. A method for managing garbage collection process, performed by a flash controller, comprising:
   determining source blocks to be processed, wherein each source block comprises an invalid page;
   calculating a quantity of the valid pages in the source blocks;
   determining whether the quantity of the valid pages is less than a total number of pages in one first-type physical block;
   when the quantity of the valid pages is less than the total number of pages in one first-type physical block, programing user data of valid pages in the source blocks into empty pages in a second-type physical block, wherein the total number of pages in one first-type physical block is greater than a total number of pages in one second-type physical block; and filling remaining empty pages in the second-type physical block with dummy values.

8. The method of claim 7, comprising:

when the quantity of the valid pages is equal to or greater than the total number of pages in one first-type physical block, programing user data of i×N valid pages in the source blocks into at least one first-type physical block, wherein i×N<M, i represents an integer greater than zero, M represents the quantity of the valid pages, and N represents the total number of pages in one first-type physical block, and programing user data of the remaining valid pages in the source blocks into an empty page of the second-type physical block; and when the quantity of the valid pages is less than the total number of pages in one first-type physical block, programing user data of the valid pages in the source blocks into an empty page of the second-type physical block.

9. The method of claim 7, wherein the total number of pages in one first-type physical block is at least twice the total number of pages in one second-type physical block.

10. The method of claim 7, wherein the first-type physical block is a Triple Level Cell (TLC) block or a Quad-Level Cell (QLC) block, and the second-type physical block is a Single Level Cell (SLC) block.

11. The method of claim 10, wherein each physical wordline of the TLC block stores user data of triple-pages, each physical wordline of the QLC block stores user data of quad-pages, and each physical wordline of the SLC block stores user data of single pages.

12. The method of claim 7, wherein each source block is a Single Level Cell (SLC) block.

13. The method of claim 7, comprising:

closing the second-type physical block after filling the remaining empty pages in the second-type physical block with dummy values.

14. An apparatus for managing garbage collection process, comprising:

a flash interface, coupled to a flash module; and a processing unit, coupled to the flash interface, arranged operably to determine source blocks to be processed, wherein each source block comprises an invalid page; calculate a quantity of the valid pages in the source blocks; determine whether the quantity of the valid pages is less than a total number of pages in one first-type physical block; when the quantity of the valid pages is less than the total number of pages in one first-type physical block, drive the flash interface to program user data of valid pages in the source blocks into empty pages in a second-type physical block, wherein the total number of pages in one first-type physical block is greater than a total number of pages in one second-type physical block; and drive the flash interface to fill remaining empty pages in the second-type physical block with dummy values.

15. The apparatus of claim 14, wherein the processing unit is arranged operably to drive the flash interface to program user data of i×N valid pages in the source blocks into at least one first-type physical block and program user data of the remaining valid pages in the source blocks into an empty page of the second-type physical block when the quantity of the valid pages is equal to or greater than the total number of pages in one first-type physical block, wherein i×N<M, i represents an integer greater than zero, M represents the quantity of the valid pages, and N represents the total number of pages in one first-type physical block; and drive the flash interface to program user data of the valid pages in the source blocks into an empty page of the second-type physical block when the quantity of the valid pages is less than the total number of pages in one first-type physical block.

16. The apparatus of claim 14, wherein the total number of pages in one first-type physical block is at least twice the total number of pages in one second-type physical block.

17. The apparatus of claim 14, wherein the first-type physical block is a Triple Level Cell (TLC) block or a Quad-Level Cell (QLC) block, and the second-type physical block is a Single Level Cell (SLC) block.

18. The apparatus of claim 17, wherein each physical wordline of the TLC block stores user data of triple-pages, each physical wordline of the QLC block stores user data of quad-pages, and each physical wordline of the SLC block stores user data of single pages.

19. The apparatus of claim 14, wherein each source block is a Single Level Cell (SLC) block.

20. The apparatus of claim 14, wherein the processing unit is arranged operably to close the second-type physical block after filling the remaining empty pages in the second-type physical block with dummy values.

* * * * *